United States Patent [19]

Migliavacca

[11] Patent Number: 4,494,893
[45] Date of Patent: Jan. 22, 1985

[54] ADJUSTABLE APPARATUS FOR SUPPORTING AN UNDERWATER PIPE LAID AT GREAT DEPTH OVER A DEPRESSION IN THE SEA BED

[75] Inventor: Enrico Migliavacca, S. Giuliano Milanese, Italy

[73] Assignee: Snam S.p.A., Milan, Italy

[21] Appl. No.: 475,399

[22] Filed: Mar. 15, 1983

[30] Foreign Application Priority Data

Mar. 19, 1982 [IT] Italy .................. 20263 A/82

[51] Int. Cl.³ .................. F16L 1/04; F16L 3/00
[52] U.S. Cl. .................. 405/172; 405/158; 248/49
[58] Field of Search ........ 405/154, 158, 166, 171–173, 405/198; 248/49, 55, 59, 188.5, 188.9, 408, 423

[56] References Cited

U.S. PATENT DOCUMENTS

| | | | |
|---|---|---|---|
| 1,044,523 | 11/1912 | Hedman | 248/408 X |
| 2,540,679 | 2/1951 | Laffaille | 405/198 X |
| 3,137,512 | 6/1964 | Carpezzi | 248/408 X |
| 3,208,698 | 9/1965 | Samhammer | 248/188.9 X |
| 4,140,292 | 2/1979 | Kaigler | 405/154 X |
| 4,146,345 | 3/1979 | Silvestri | 405/172 |
| 4,185,936 | 1/1980 | Takahashi | 248/188.5 X |
| 4,252,466 | 2/1981 | Berh | 405/158 X |
| 4,355,925 | 10/1982 | Rognoni | 405/158 X |

FOREIGN PATENT DOCUMENTS

| | | | |
|---|---|---|---|
| 429328 | 11/1974 | U.S.S.R. | 405/158 |
| 507741 | 4/1976 | U.S.S.R. | 405/172 |

*Primary Examiner*—Cornelius J. Husar
*Assistant Examiner*—Nancy J. Stodola
*Attorney, Agent, or Firm*—Hedman, Gibson, Costigan & Hoare

[57] ABSTRACT

An adjustable apparatus for supporting an underwater pipe suspended over a depression in great and medium depth sea beds, comprising an upper floating structure which enables the apparatus to be introduced into the sea and mounted over the pipe to be supported, and a lower structure constituted essentially by two telescopic legs able to rest on the sea bed, and two half saddles which adhere to the surface of the pipe to be kept raised.

5 Claims, 7 Drawing Figures

Fig.3 Fig.3a
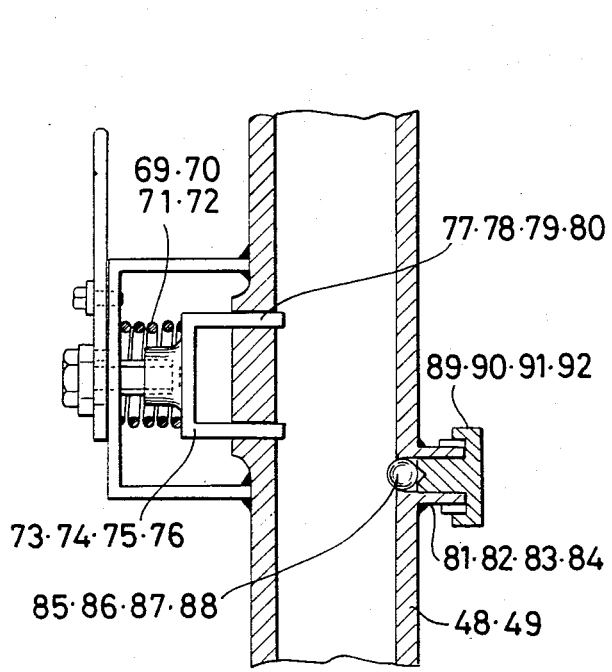
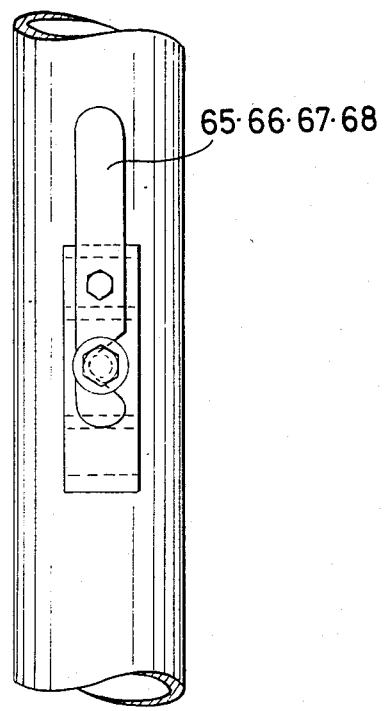
Fig.4 Fig.4a
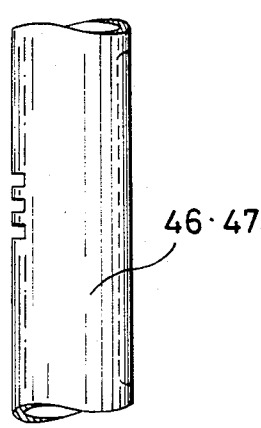

ADJUSTABLE APPARATUS FOR SUPPORTING AN UNDERWATER PIPE LAID AT GREAT DEPTH OVER A DEPRESSION IN THE SEA BED

This invention relates to an adjustable apparatus which enables an underwater pipe suspended over a depression in great and medium depth sea beds to be supported, whatever the distance between the pipe and the sea bed, and for any configuration, slope and nature of the sea bed.

Various adjustable apparatus for supporting a pipe suspended over depressions in sea beds of great depth are already known. Some of these apparatus have the drawback both of being very complicated, and of having to be lowered from the depot ship on to the suspended pipe by means of guide cables anchored to said pipe, because of which depot ships have to be used which are able to anchor at great depth. These drawbacks lead to high operational costs.

In contrast, other apparatus require no connection between the pipe and the depot ship, and can thus use a particularly economical craft, but have the drawback of a considerable overall height, so that they can be used only in those cases in which the pipe to be supported is at a suitable distance from the sea bed, and where the sea bed itself is level and free from unevenness.

The object of the present invention is to obviate the aforesaid drawbacks by providing an adjustable apparatus of simple structure and easy installation, which is of small overall height and can be easily lowered from a ship on to the pipe to be supported which is suspended over a depression, even in sea beds of great depth. The adjustable apparatus for supporting a submerged pipe comprises an upper floating structure which enables the apparatus to be introduced into the sea and mounted over the pipe to be supported, and a lower structure which is constituted essentially by two telescopic legs able to rest on the sea bed, and two half saddles which adhere to the surface of the pipe to be kept raised. More specifically, according to one characteristic of the present invention, the adjustable apparatus comprises an upper structure, namely a compensator, and a lower structure forming the support, the upper structure being constituted by a main beam and a buoyancy tank rigid with the beam by means of a framework, said main beam being provided with a device for releasing the cables which are connected to said beam in order to support the lower structure during its introduction into the sea and its mounting over the pipe, and two hooks to enable said lower structure to be recovered should this be necessary, the lower structure being constituted by two fixed legs, two half saddles of suitable dimensions for supporting the pipe, each mounted rigidly at a defined distance from the end of the fixed legs, two mobile legs each provided with a base plate and housed inside the fixed legs such that once the two half saddles are resting on the pipe, said mobile legs slide downwards until they lie on the sea bed, when they are then locked to said fixed legs, and two plates rigidly connected to the upper ends of the fixed legs, said plates being connected together at the end opposite the end at which they are connected to the legs, in such a manner as to allow said plates to rotate relative to each other in the same plane, there being provided perpendicular to said plates a pin of suitable length which extends beyond said plates, (in a preferred embodiment of the invention the pin passes through the axis of relative rotation of the two plates), at the end of the pin there being provided a suitably dimensioned guide saddle, the purpose of which is to facilitate the coupling of the support to the pipe during its laying, there being finally hinged to one of said plates a strut which locks the rotary movement of the leg connected to the other plate.

According to a further characteristic of the present invention, the support cable release device located on the steel beam of the compensator is formed from a hydraulic cylinder which is operated by a hydropneumatic accumulator and in which there slides a piston, to the end of which there is fixed a head connected by connecting rods and levers to a shaft to which a rotary movement is transmitted by the movement of the piston, said shaft being itself connected to the support cables by means of levers, pins and rods, so as to convert the rotary movement into a rectilinear movement in order to be able to release said support cables.

According to a further characteristic of the present invention, the downward sliding of the mobile legs locked inside the fixed legs by means of suitable pins is effected by rotating a lever rigid with a cam fixed on to the pin perpendicular to the plates, the rotation of the lever rigid with the cam causing the pins to emerge from their seat, said pins being indirectly connected to the cam by means of a rod, a counter-lever and several springs, thus releasing the mobile legs from the fixed legs.

According to a further characteristic of the present invention, rotation of the mobile legs after their release from the respective retention pins is prevented by suitable guides provided on said mobile legs, and by balls opposed by a plug and housed in suitable seats provided in the fixed legs.

According to a further characteristic of the present invention, the mobile legs are locked to the fixed legs, when resting on the sea bed, by pegs which are located in suitable seats provided in the fixed legs, and which are inserted into corresponding teeth formed by mechanical machining on the mobile legs, said locking being carried out by one or more levers located in proximity to the ends of the fixed legs, and rigidly connected to several springs which urge said pegs against said teeth.

The invention will be more apparent from the detailed description given hereinafter with reference to the accompanying drawings which illustrate a preferred embodiment of the invention given by way of non-limiting example.

FIG. 3 is a cross-sectional detail showing the locking of the mobile legs to the fixed legs of the support.

FIG. 3a is a side view of the locking mechanism shown in FIG. 3.

FIG. 4 is an elevational view of the slidable legs showing the teeth.

FIG. 4a is a side view of the slidable legs shown in FIG. 4.

Figure 1:
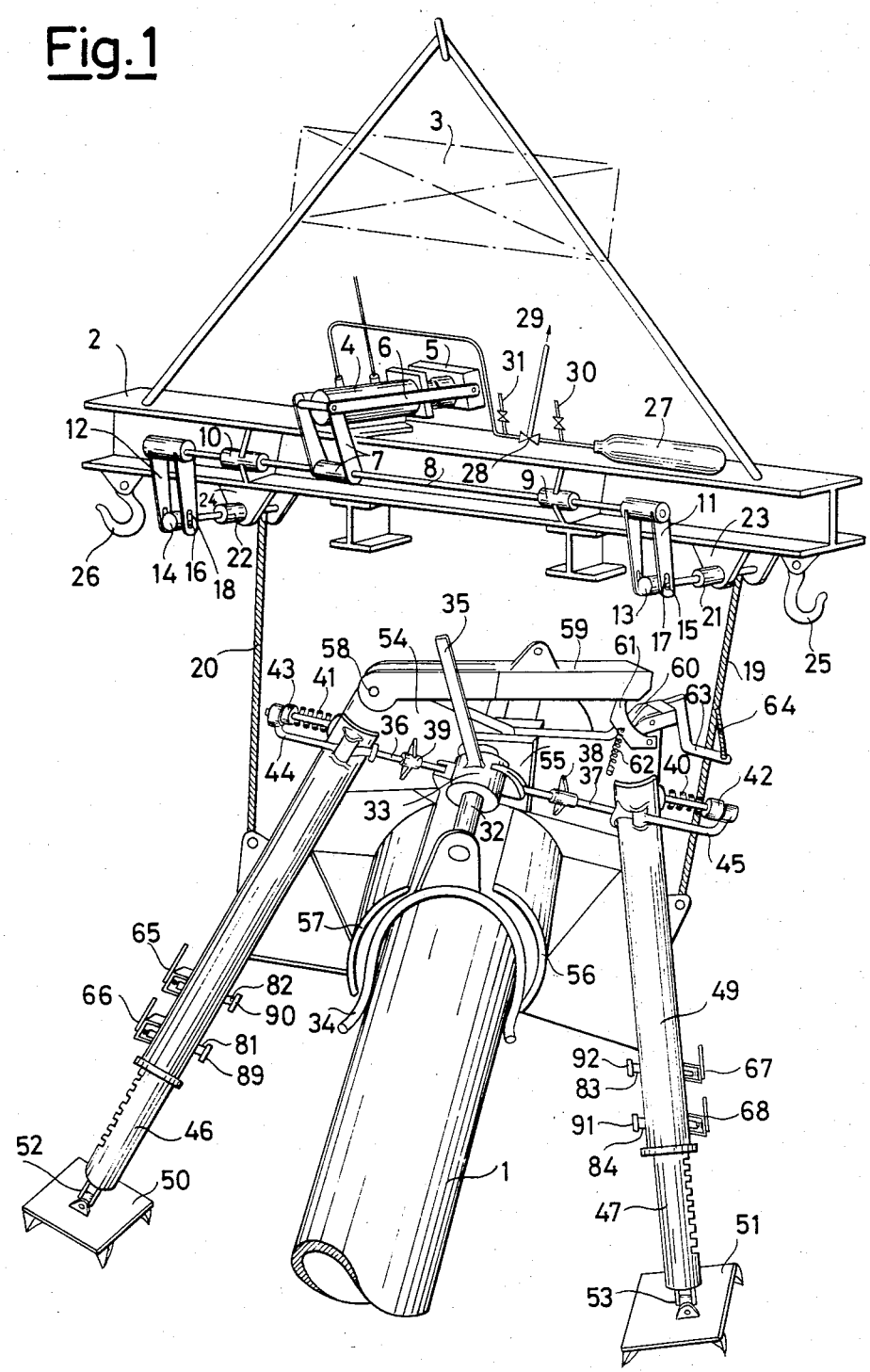
FIG. 1 is a perspective view of the assembly comprising the compensator and support.

In FIG. 1, the reference numeral 1 indicates a portion of the underwater pipe which, being suspended by the effect of the uneven sea bed, has to be supported by the apparatus according to the invention.

Said apparatus comprises an upper structure and a support structure, which are separate from each other.

The upper structure is constituted by a steel beam 2 and a parallelepiped buoyancy tank 3, which is made rigid with the structure 2 by means of a framework.

On the base beam of the structure there is mounted a double acting hydraulic cylinder 4, in which there slides a piston, to the end of which is fixed the head 5 which is connected to the lever 7 by means of connecting rods 6, said lever being rigid with the shaft 8 which itself is supported by the supports 9 and 10 connected to the base beam of the framework.

The levers 11 and 12 are rigidly fixed to the two ends of the shaft 8, and at their ends they accommodate the rods 13 and 14, which are connected to said levers by means of the pins 15 and 16. The guide slots 17 and 18 provided in the levers 11 and 12 enable the rods 13 and 14, with the aid of the pins 15 and 16, to convert the rotary movement of the shaft 8, transmitted by the movement of the piston of the cylinder 4 to the linkages 5, 6 and 7, into a reciprocating rectilinear movement of the rods 13 and 14, thus enabling the cables which hold the support to be released. The rods slide in the guide bushes 21 and 22 which are firmly connected to the lugs 23 and 24 rigid with the base beam of the upper structure.

The two hooks 25 and 26 enable the support to be recovered by hooking the cables 19 and 20 to them.

Figure 2:
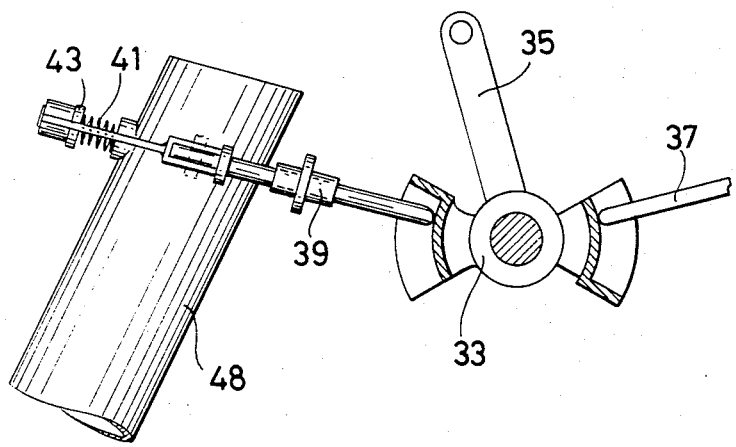
FIG. 2 is a detail showing the release of the mobile legs from the fixed legs.
Figure 2A:
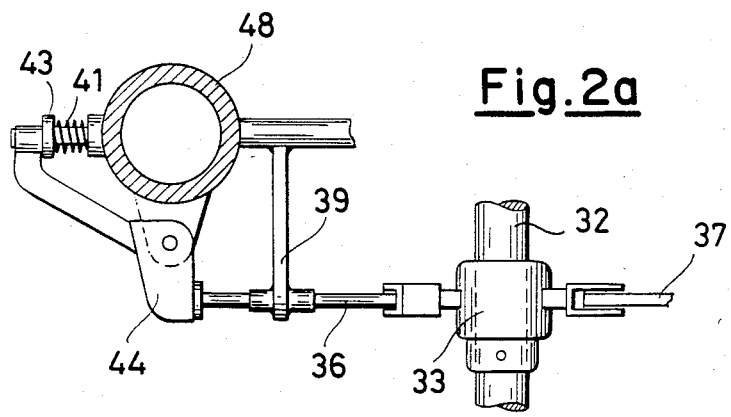
FIG. 2a is a front elevational view of the release mechanism shown in FIG. 2.

The cylinder 4 is operated by connecting it to the hydropneumatic accumulator 27 by rotating the control lever 29 of the valve 28. On being operated, the valves 30 and 31 enable the release system for the cables 19 and 20 to be again set for another support. The support structure for the underwater pipe portion mainly comprises two symmetrical structures hinged on the main pin 32 on which the cam 33 and guide saddle 34 are also freely mounted. On moving to the left the lever 35 which is connected rigidly to the cam 33, as shown in detail in FIGS. 2 and 2a, the rods 36 and 37, which are supported by the respective supports 38 and 39, emerge from their respective guides in the cam 33, the effect of the thrust exerted by the springs 40 and 41 opposed by the fork levers 44 and 45 then causing the expulsion of the pins 42 and 43, thus releasing from said pins 42 and 43 the mobile legs 46 and 47 which are held inside the fixed legs 48 and 49.

The lower ends of the mobile legs are connected to the base plates 50 and 51 of the support by means of a spherical hinge 52 and 53. The lower faces of the base plates 50 and 51 are provided with teeth which drive into the sea bed to provide a stable bearing for the support.

The teeth shown in detail in FIGS. 4 and 4a are provided on the slidable legs 46 and 47.

The fixed legs 48 and 49 have their upper ends rigidly connected respectively to the plate 54 acting as the male element, and to the plate 55 acting as the female element, these being connected together by the pin 32.

The half saddles 56 and 57 which embrace the underwater pipe 1 are connected to the fixed legs 48 and 49 by suitable welded gusset plates.

The plate 54 is provided with a bore housing the pin 58 on which the strut 59 rotates.

When the half saddles 56 and 57 embrace the pipe 1, the support rests on the pipe by way of a guide saddle 34, and at that precise moment the strut 59 enters its seat 60, the cam 61 is pulled downwards by the spring 62, and the fork lever 63 also falls downwards because the cables 19, 20 and 64 are freed from the weight of the support.

As shown in FIGS. 3 and 3a, when the mobile legs 46 and 47 have been released on to the sea bed by rotating the lever 35 towards the left, they are again locked to the fixed legs 48 and 49 by rotating the levers 65, 66, 67 and 68, of which the cams release the springs 69, 70, 71 and 72, these released springs then thrusting against the bridge 73, 74, 75, 76 fitted with the pegs 77, 78, 78, 80, which enter the rack to lock the legs.

Seats 81, 82, 83, 84 are provided in the fixed legs in positions opposite said pegs, in order to house balls 85, 86, 87, 88, which enter the guide groove provided on the mobile legs (FIG. 4). The balls are kept in their seats by the plugs 89, 90, 91, 92.

I claim:

1. An adjustable apparatus for supporting an underwater pipe suspended over a depression in a sea bed of great or medium depth, having an upper floating structure which enables the apparatus to be introduced into the sea bed and mounted over the pipe to be supported, and a lower structure which includes a pair of telescopic legs able to rest on the sea bed, and a pair of half saddles for supporting the pipe, said upper structure, having a main beam and a buoyancy tank fixed thereto, wherein said main beam is provided with a device for releasing the cables connected to said beam in order to support the lower structure during the introduction of the apparatus into the sea and the mounting of the apparatus over the pipe, and a pair of hooks for recovering said lower structure, said lower structure having a pair of fixed legs, a pair of half saddles for supporting the pipe, each rigidly mounted at a defined distance from said fixed legs, a pair of mobile legs each provided with a base plate and housed inside the fixed legs such that once the half saddles are resting on the pipe said mobile legs can slide downward until they lie on the sea bed where they are then locked to said fixed legs, a pair of plates rigidly connected on one end to the upper ends of the fixed legs and connected together at the opposite end in such a manner as to enable said plates to rotate relative to each other in the same plane, a pin positioned perpendicular to said plates having a length which extends beyond said plates, wherein said pin has a guide saddle at one end thereof, the purpose of which facilitates the coupling of the half saddles for supporting the pipe while being placed underwater, and a strut hinged to one of said plates which locks the rotary movement of the leg connected to the other plate.

2. An apparatus as claimed in claim 1, wherein the support cable release device located on the main beam includes a hydraulic cylinder which is operated by a hydropneumatic accumulator and in which a piston slides and to one end of which there is fixed a head connected by connecting rods and levers to a shaft to which a rotary movement is transmitted by the movement of the piston, said shaft being connected to the support cables by means of levers, pins and rods, so as to convert the rotary movement into a rectilinear movement to release said support cables.

3. An apparatus as claimed in claim 1, wherein the downward sliding of the mobile legs is locked inside the fixed legs by means of suitable pins and is effected by rotating a lever rigid with a cam fixed on to the pin perpendicular to the plates, the rotation of the lever rigid with the cam causing the pins to emerge from their seat, said pins being indirectly connected to the cam by means of a rod, a counter-lever and several springs, thus releasing said mobile legs from the fixed legs.

4. An apparatus as claimed in claim 1, wherein the mobile legs, when resting on the sea bed, are locked to the fixed legs by pegs which are located in suitable seats provided in the fixed legs, and which are inserted into corresponding teeth machining on the mobile legs, said locking being carried out by one or more levers located in proximity to the lower ends of the fixed legs, and rigidly connected to several springs which urge said pegs against said teeth.

5. An apparatus as claimed, in claim 3, in which the pin perpendicular to the plates passes through the axis of relative rotation of said pair of plates.

* * * * *